(12) United States Patent
Ishiyama et al.

(10) Patent No.: US 6,738,214 B2
(45) Date of Patent: May 18, 2004

(54) DETECTION OF STATIC AND DYNAMIC POSITION OF DISK DRIVE

(75) Inventors: Kiyoshi Ishiyama, Ome (JP); Katsuhiko Kaida, Nishitama-gun (JP)

(73) Assignee: Kabushiki Kaisha Toshiba, Tokyo (JP)

(*) Notice: Subject to any disclaimer, the term of this patent is extended or adjusted under 35 U.S.C. 154(b) by 293 days.

(21) Appl. No.: 09/955,959

(22) Filed: Sep. 20, 2001

(65) Prior Publication Data

US 2003/0067705 A1 Apr. 10, 2003

(30) Foreign Application Priority Data

Sep. 22, 2000 (JP) ..................................... 2000-288322

(51) Int. Cl.[7] .............................................. G11B 21/02
(52) U.S. Cl. .......................... 360/75; 73/12.14; 73/488; 360/69
(58) Field of Search ...................... 360/60, 75; 73/488, 73/489, 12.14

(56) References Cited

U.S. PATENT DOCUMENTS 5,235,472 A * 8/1993 Smith .......................... 360/60
5,982,573 A * 11/1999 Henze .......................... 360/75

FOREIGN PATENT DOCUMENTS

| JP | 5-64746 | 3/1993 |
|---|---|---|
| JP | 7-201124 | 8/1995 |
| JP | 8-221886 | 8/1996 |

* cited by examiner

Primary Examiner—David Hudspeth
Assistant Examiner—Daniell L Negrón
(74) Attorney, Agent, or Firm—Pillsbury Winthrop LLP (57) ABSTRACT

A 2-axis acceleration sensor has two detection axes (X- and Y-axes), and detects a dynamic acceleration (shock) and a static acceleration (a change in gravity or tilt). A sensor output extraction unit acquires detection signals corresponding to the static acceleration for respective detection axes by extracting frequency components lower than a frequency component associated with the dynamic acceleration. A CPU determines whether the disk drive is dropping, whether it has a tilt, and so forth, based on the acquired detection signals for respective detection axes, and causes a magnetic head to be retracted to the position of a ramp if such state is detected.

12 Claims, 7 Drawing Sheets

Static acceleration
$X=0 \quad Y=g_{1max}$

Dynamic acceleration
$X=0 \quad Y=0$

FIG. 6

Static acceleration
$X=0 \quad Y=0$

Dynamic acceleration
$X=0 \quad Y=0$

FIG. 7

Static acceleration
$X=g_{1xv} \quad Y=g_{1yv}$

Dynamic acceleration
$X=0 \quad Y=0$

X-direction
$|\pm g_{2xh}| < |\pm g_{2xv}|$

Y-direction
$|\pm g_{2yh}| < |\pm g_{2yv}|$

FIG. 14

Static acceleration
$X=0 \quad Y=g_{2y}$

Dynamic acceleration
$X=g_{2x}', \quad Y=g_{2y}'$

When shock externally acts

FIG. 15

DETECTION OF STATIC AND DYNAMIC POSITION OF DISK DRIVE

CROSS-REFERENCE TO RELATED APPLICATIONS

This application is based upon and claims the benefit of priority from the prior Japanese Patent Application No. 2000-288322, filed Sep. 22, 2000, the entire contents of which are incorporated herein by reference.

BACKGROUND OF THE INVENTION

1. Field of the Invention

The present invention relates to a disk drive and, more particularly, to a disk drive that has taken a measure against a shock in dropping and the like.

2. Description of the Related Art

Conventionally, magnetic disk drives (HDDS) as information recording media are prevalently used in information processing apparatuses such as personal computers and the like. When the user inadvertently drops such magnetic disk drive in use, a head or disk in the magnetic disk drive may be damaged or operate erroneously.

To solve this problem, an unstable state of the magnetic disk drive must be detected before any shock acts on the magnetic disk drive to prevent the magnetic disk drive from being damaged. As a technique for implementing this, for example, Jpn. Pat. Appln. KOKAI Publication No. 8-29450 is available.

This document discloses a technique in which a magnetic disk drive has a state sensor that comprises a housing having an internal spherical cavity, a spherical conductive member movably sealed in the cavity, a plurality of electrodes arranged on the inner surface of the cavity, and a plurality of terminals for applying voltages to these electrodes, and data read/write access is interrupted in accordance with the detection state of the state sensor.

However, with the technique of the above document, the state sensor occupies a large area and space in the magnetic disk drive. Also, with the technique of the above document, a change in magnetic disk drive such as dropping or the like can be detected, but it is difficult to accurately determine the current state. Furthermore, with the technique of the above document, operation errors readily occur and the detection precision is low since a mechanism for detecting the state by an analog scheme, i.e., using the conductive member moving inside the cavity is used.

On the other hand, a shock sensor may be used to detect the state by a digital scheme. However, since the shock sensor is dedicated to detect a shock (dynamic acceleration), it cannot detect a change in gravity or tilt (static acceleration).

BRIEF SUMMARY OF THE INVENTION

Accordingly, it is an object of the present invention to provide a disk drive which is capable of precisely detecting an unstable state, dropping state, or the like by a simple arrangement while reducing a mounting area, and is capable of satisfactorily taking a measure against a shock in dropping or the like.

According to one aspect of the present invention, there is provided a disk drive comprising: an acceleration sensor which has at least two detection axes and detects dynamic and static accelerations; an extraction unit which acquires detection signals corresponding to the static acceleration for respective detection axes by extracting frequency components lower than a frequency component associated with the dynamic acceleration; and a processing unit which determines whether or not a head is to be retracted, based on the acquired detection signals for respective detection axes.

According to another aspect of the present invention, there is provided a disk drive comprising: a printed circuit board; an acceleration sensor which is mounted on the printed circuit board, has at least two detection axes, and detects dynamic and static accelerations; an extraction unit which is mounted on the printed circuit board, and acquires detection signals corresponding to the static acceleration for respective detection axes by extracting frequency components lower than a frequency component associated with the dynamic acceleration; and a processing unit which determines whether or not a head is to be retracted, based on the acquired detection signals for respective detection axes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described with reference to the accompanying drawings.

Figure 1:
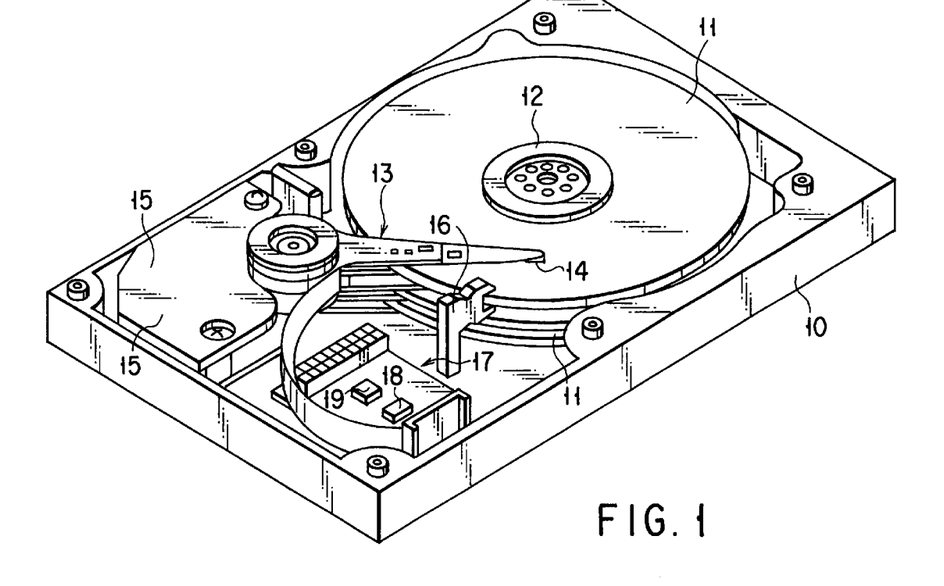
FIG. 1 is a perspective view showing the internal structure of a magnetic disk drive according to an embodiment of the present invention.
Figure 2:
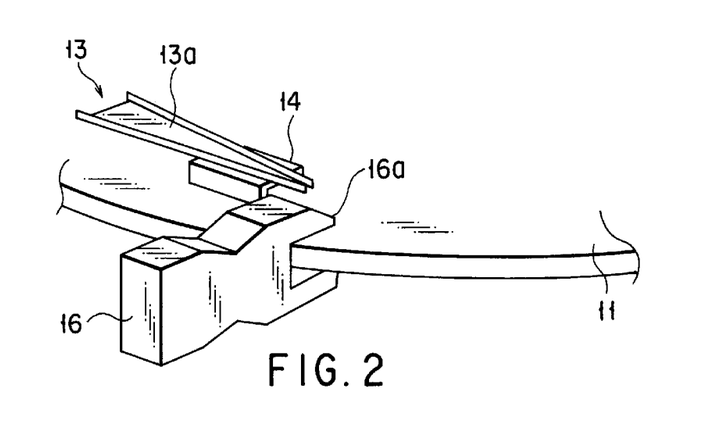
FIG. 2 is a perspective view mainly showing the outer appearance of a ramp used to retract a head in the magnetic disk drive.
Figure 3:
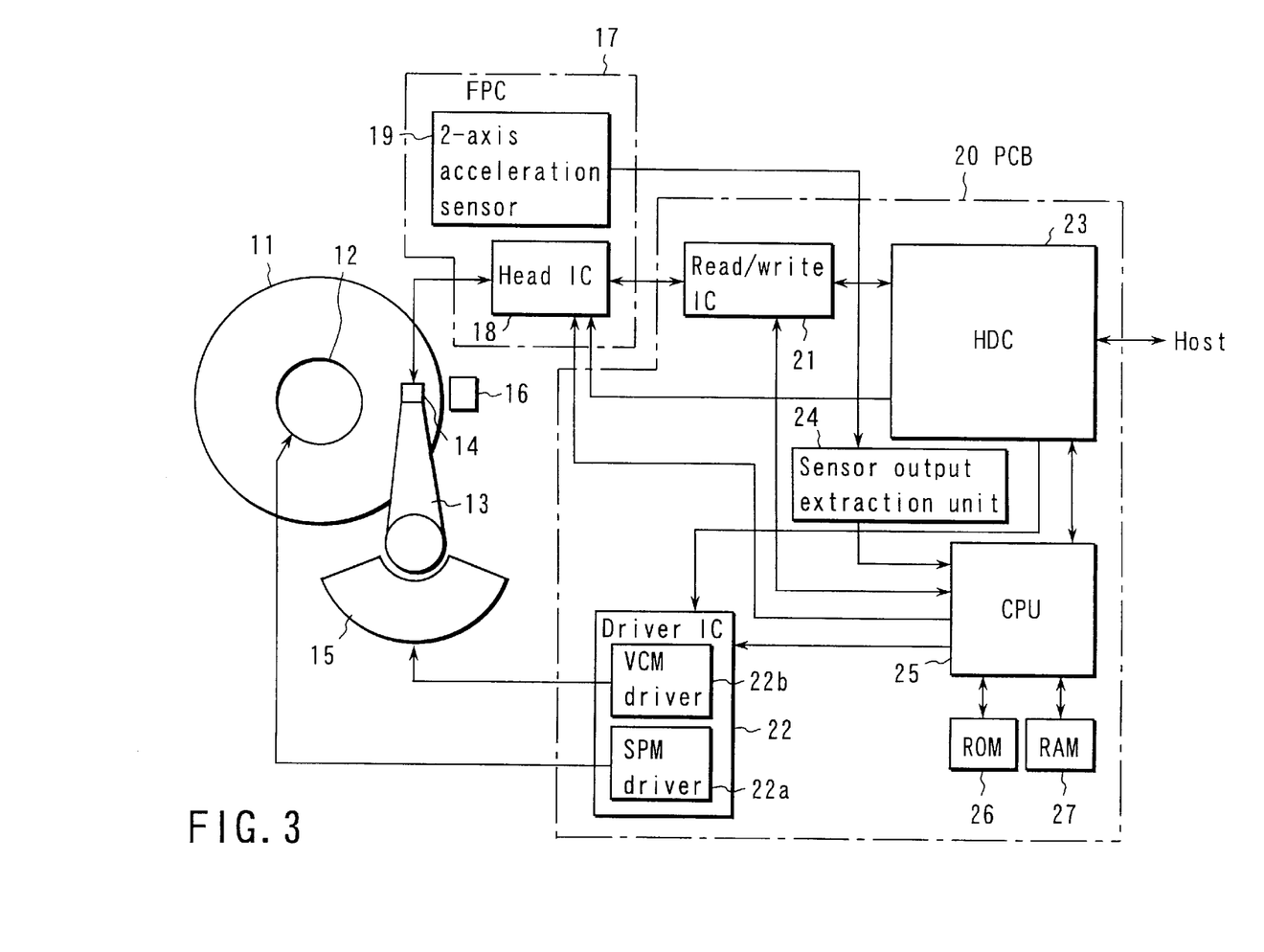
FIG. 3 is a block diagram showing the circuit arrangement of the magnetic disk drive.

FIG. 1 is a perspective view showing the internal structure of a magnetic disk drive according to an embodiment of the present invention, FIG. 2 is a perspective view mainly showing the outer appearance of a ramp used to retract a head in the magnetic disk drive, and FIG. 3 is a block diagram showing the circuit arrangement of the magnetic disk drive.

The magnetic disk drive of this embodiment is formed into, e.g., a card shape, and is portable when it is used. When the magnetic disk drive is connected to a dedicated connecting portion equipped in advance on an information apparatus such as a computer, portable information terminal, or the like, the information apparatus can read out information stored in the magnetic disk drive and can write information in the magnetic disk drive.

The magnetic disk drive (to be abbreviated as an HDD hereinafter) shown in FIG. 1 has a rectangular box-shaped case 10 with an upper opening, and a top cover (not shown) that covers the upper opening of the case 10.

The case 10 houses a plurality of magnetic disks 11 as magnetic recording media, a spindle motor 12 for supporting and rotating these magnetic disks 11, carriages (rotary head actuators) 13, magnetic heads 14 for recording/reproducing information on/from the disks 11, a voice coil motor (VCM) 15 serving as a drive source of the carriages 13, a ramp (ramp mechanism) 16 used to retract each head 14, a flexible printed circuit board (to be abbreviated as an FPC hereinafter) 17, and the like.

Each magnetic head 14 is attached to the distal end of the carriage 13 to face the recording surface of each disk 11. The head 14 moves in the radial direction of the disks 11 upon pivotal movement (angular rotation) of the carriage 13. The carriage 13 has the VCM 15, and is driven by this VCM 15. The VCM 15 drives the carriage 13 in accordance with an instruction from the VCM driver 22b.

The ramp 16 used to retract each head 14 in, e.g., a rotation stop state of the disks 11 is arranged near the outer circumferential surfaces of the disks 11, as shown in FIGS. 2 and 3. This ramp 16 is provided in the vicinity of the disk 11 and at a specified position on a moving path of the distal end (tab) of a suspension 13a attached to the carriage 13, as shown in FIG. 2. The distal end portion (the end portion on the side of the disk 11) of the ramp 16 forms a slope 16a so as to easily retract the head 14. In unloading, i.e., moving each head 14 from a position above the disk 11 onto the ramp 16, the distal end (tab) of the suspension 13a of the carriage 13 slidably climbs over the slope 16a of the ramp 16. In this way, each head 14 lifts up from the disks 11, slidably moves on the ramp 16, and stops at a specified position.

On the FPC 17, a head IC (head amplifier circuit) 18 for controlling switching of the heads 14, input/output of read/write signals with the heads 14, and the like is mounted. Also, a 2-axis acceleration sensor 19 used in control according to the present invention is mounted on the FPC 17.

The head IC 18 is connected to the respective heads 14 via a wiring pattern formed on the FPC 17, as shown in FIG. 3.

The head IC 18 selects one of the heads 14, amplifies an analog output (read signal of the head 14) read by the selected head 14, executes a predetermined signal process of write data sent from a read/write IC 21 (to be described later), and sends the processed write data to the selected head 14.

Figure 4:
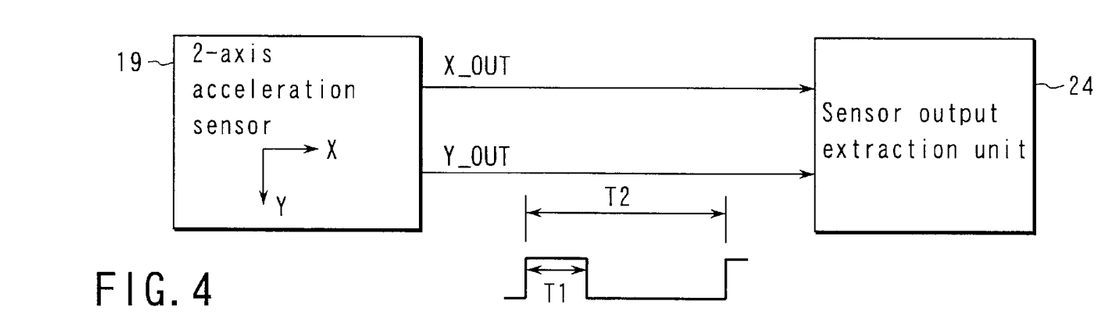
FIG. 4 is a diagram for explaining a 2-axis acceleration sensor used in the magnetic disk drive.

The 2-axis acceleration sensor 19 is a sensor (IC) for measuring a dynamic acceleration corresponding to a shock, and a static acceleration corresponding to a change in gravity or tilt, and adopts, e.g., ADXL202/ADXL210 or the like available from Analog Devices, Inc. The 2-axis acceleration sensor 19 expresses accelerations measured in the directions of two detection axes (X- and Y-axes) in the form of duty cycles (T1/T2), and outputs them as digital signals X_OUT and Y_OUT, as shown in FIG. 4. These output signals are sent to a CPU 25 via a sensor output extraction unit 24. In this embodiment, using such 2-axis acceleration sensor 19, a "shock (dynamic acceleration)" and a "dropping state or unstable state before dropping (static acceleration)" of the HDD are detected.

A printed circuit board (to be abbreviated as a PCB hereinafter) 20 is provided on the outer surface of the case 10 to oppose the bottom surface of the case. On the PCB 20, the read/write IC 21, a driver IC 22, a hard disk controller (HDC) 23, the sensor output extraction unit 24, the CPU 25, a ROM 26, and a RAM 27 are mounted as principal circuit components of the HDD. The sensor output extraction unit 24 may be mounted on the FPC 17 in place of the PCB 20.

The read/write IC 21 executes a signal process required to decode data from a signal reproduced by each head 14 and amplified by the head IC 18, a signal process required to record data on each disk 11, and the like.

The driver IC 22 includes an SPM driver 22a for driving spindle motor 12, and the VCM driver 22b for driving the VCM 15.

The HDC 23 controls a protocol process for exchanging commands and data with an external apparatus such as a personal computer or the like, read/write control with respect to each disk 11 via the read/write IC 21, and the like.

The sensor output extraction unit 24 extracts dynamic and static accelerations on the basis of the output signals from the 2-axis acceleration sensor 19. Since the aforementioned 2-axis acceleration sensor 19 can measure both the dynamic and static accelerations, a signal must be output to the CPU 25 after it is checked if the actually measured acceleration is a dynamic or static acceleration. As a method of implementing extraction of accelerations, an extraction method using a filter based on different frequency bands, and an extraction method based on different detection times may be used, as will be described in detail later. The sensor output extraction unit 24 sends signals obtained by extracting dynamic and static accelerations in both the X- and Y-axis directions using such scheme to the CPU 25.

The CPU 25 controls the overall operation in the HDD. For example, when the HDD is operative, the CPU 25 executes the control characterizing the embodiment of the invention by executing a predetermined control program on the basis of the output signals from the 2-axis acceleration sensor 19 obtained via the sensor output extraction unit 24. In this control, upon detecting a dropping state, unstable state, or shock inflicted state of the HDD, the CPU 25 controls to immediately retract each head 14 located above the disk 14 onto the ramp 16 via the VCM driver 22b, VCM 15, and carriage 13 so as to prevent operation errors and damages to the head 14 and disk 11 due to a shock.

The ROM 26 stores a control program and the like for implementing the control according to the present invention. The RAM 27 provides a work area and the like of the CPU 25.

The sequence for distinctively detecting any shock and unstable state of the HDD from the output signals of the 2-axis acceleration sensor 19 will be explained below with reference to FIG. 5.

Figure 5:
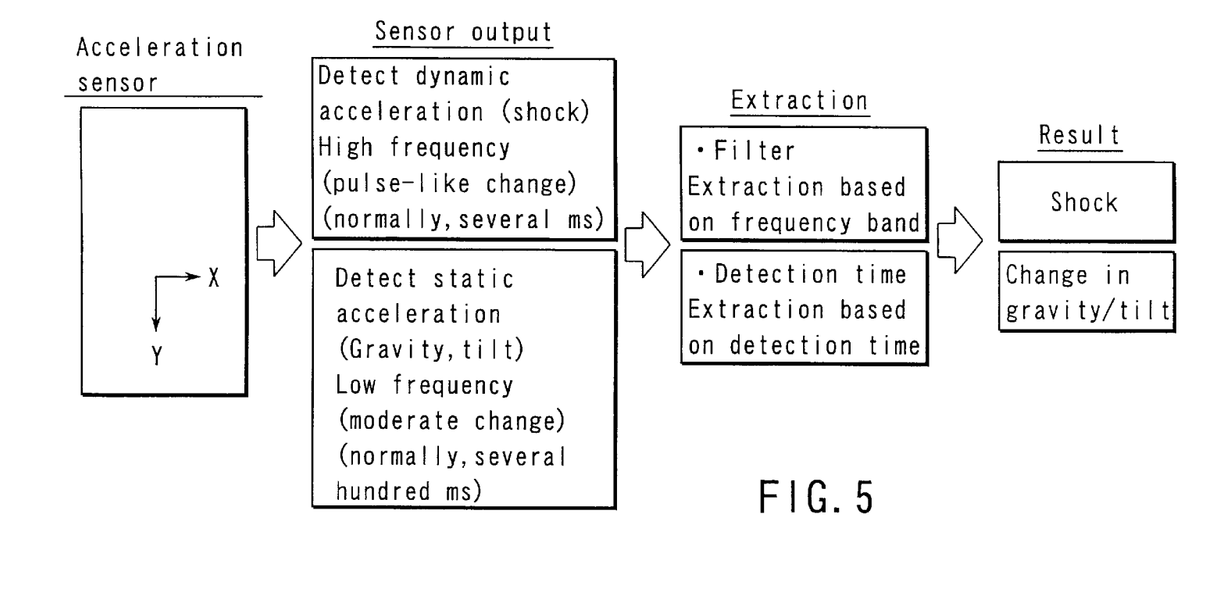
FIG. 5 is a chart for explaining a sequence for distinctively detecting any shock and unstable state of the magnetic disk drive from the output signal of the 2-axis acceleration sensor.

As shown in FIG. 5, accelerations measured in the directions of predetermined two axes (X- and Y-axes) by the 2-axis acceleration sensor 19 are output as digital signals.

The output signals from the 2-axis acceleration sensor 19 contain dynamic acceleration components corresponding to a shock or contain static acceleration components corresponding to a change in gravity or tilt. The dynamic acceleration signal normally indicates a higher frequency (pulse-like change), the period of which is about several ms. By contrast, the static acceleration signal normally indicates a lower frequency (moderate change), the period of which is about several hundred ms.

In this embodiment, the sensor output extraction unit 24 extracts dynamic and static accelerations by exploiting these features. As a method of implementing extraction of accelerations, an extraction method using a filter based on different frequency bands, and an extraction method based on different detection times may be used, as described above briefly.

In the extraction method using a filter based on different frequency bands, extraction can be implemented using, e.g., a low- or high-pass filter. For example, when a low-pass filter is used, frequency components (components corresponding to a change in gravity or tilt) lower than the frequency corresponding to a shock can be separated and extracted from the output signals from the 2-axis acceleration sensor 19.

On the other hand, in the extraction method based on different detection times, extraction can be implemented by providing, e.g., a circuit for determining whether or not a signal that has exceeded a given threshold value (level) is detected within a specified period of time. For example, if a signal that has exceeded a given level can be detected within a specified period of time, the detected signal corresponds to a shock; otherwise, a signal corresponding to a change in gravity or tilt is obtained.

The sensor output extraction unit 24 extracts dynamic and static accelerations from the signals in both the X- and Y-axis directions by such method, and sends the obtained signals to the CPU 25.

The CPU 25 determines if the HDD suffers a shock greater than a specified level or a change in gravity or tilt, based on the signals sent from the sensor output extraction unit 24. If such shock or change in gravity or tilt is detected, the retract control of each head 14 is executed.

The operations of the CPU 25 for the respective states of the HDD will be explained below.

In this embodiment, two examples will be taken in correspondence with different directionalities of the X- and Y-axes in the 2-axis acceleration sensor used. The first example will be explained using FIGS. 6 to 10, and the second example will be explained using FIGS. 11 to 15.

Figure 6:
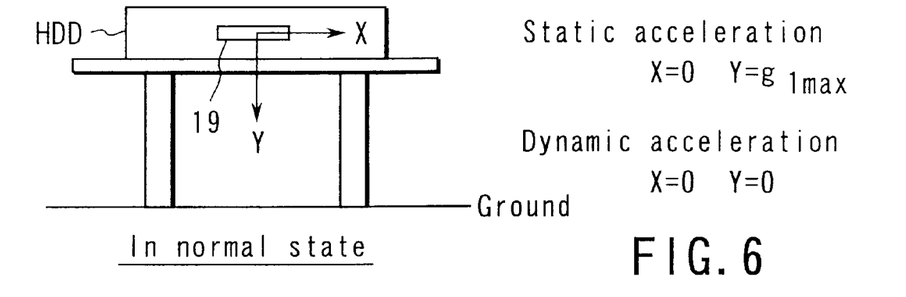
FIG. 6 is a view for explaining an operation in a normal state in a first example.

In the first example, the X-axis in the 2-axis acceleration sensor points rightward, and the Y-axis downward, as shown in FIG. 6.

In a normal state (the HDD is placed on a table) shown in FIG. 6, X- and Y-static accelerations are respectively $X=0$ and $Y=g_{lymax}$ (maximum value), and X- and Y-dynamic accelerations are respectively $X=0$ and $Y=0$. In this case, the CPU 25 does not execute the retract control of the heads 14.

Figure 7:
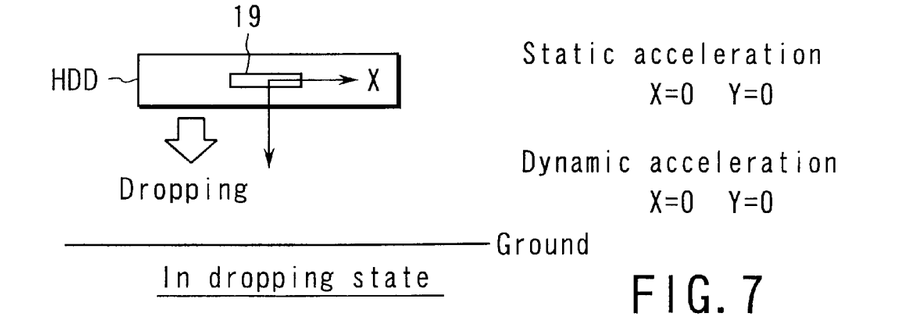
FIG. 7 is a view for explaining an operation in a dropping state in the first example.

In a dropping state (the HDD is dropping) shown in FIG. 7, X- and Y-static accelerations are respectively $X=0$ and $Y=0$, and X- and Y-dynamic accelerations are respectively $X=0$ and $Y=0$. That is, the 2-axis acceleration sensor does not detect any gravity since the HDD is dropping, and the Y-static acceleration has changed from $Y=g_{lymax}$ to $Y=0$.

When the CPU 25 detects that the Y-static acceleration becomes $Y=0$, it determines that the HDD is dropping, and executes the retract control of the heads 14. Preferably, a specified threshold value larger than 0 and smaller than $g_{lymax}$ is set in advance, and the retract control of the heads 14 is executed when the Y-static acceleration becomes smaller than this threshold value, in place of executing the retract control at the time when the Y-static acceleration becomes $Y=0$.

Figure 8:
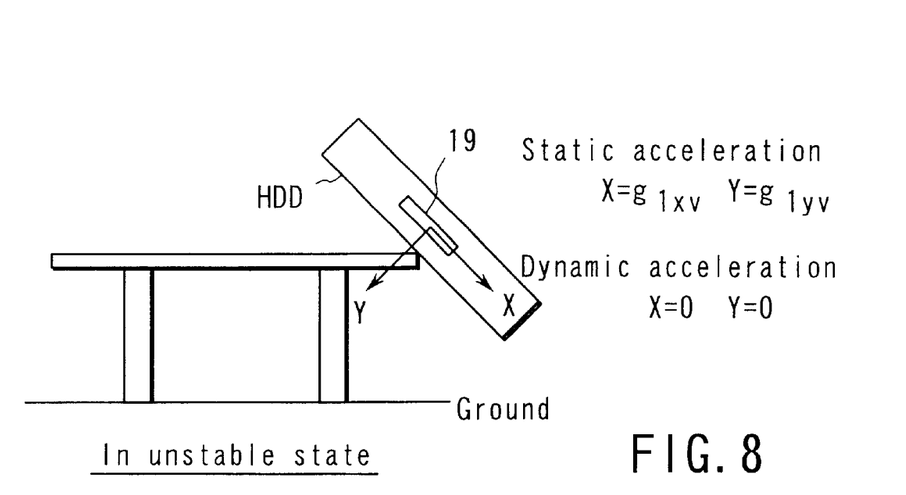
FIG. 8 is a view for explaining an operation in an unstable state in the first example.

In an unstable state (an unstable state in which the HDD tilts and is about to drop) shown in FIG. 8, X- and Y-static accelerations are respectively $X=g_{lxv}$ and $Y=g_{lyv}$, and X- and Y-dynamic accelerations are respectively $X=0$ and $Y=0$. That is, since the HDD has a tilt, the X- and Y-static accelerations respectively have changed to $X=g_{lxv}$ and $Y=g_{lyv}$.

Figure 9:
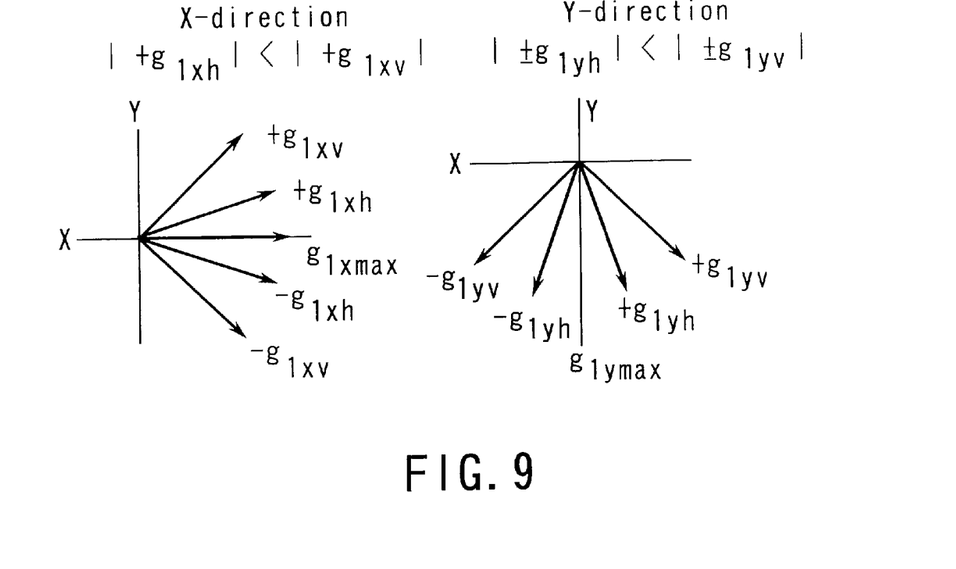
FIG. 9 is a view for explaining conditions where an unstable state is determined in the first example.

Assume that threshold values for checking if the HDD has a tilt are pre-set at $X=\pm g_{lxh}$ and $Y=\pm g_{lyh}$, as shown in FIG. 9. In this case, if a condition:

X-axis direction: $|\pm g_{lxh}|<|\pm g_{lxv}|$ or

Y-axis direction: $|\pm g_{lyh}|<|-g_{lyv}|$ is satisfied, the CPU 25 determines that the HDD is in an unstable state, and executes the retract control of the heads 14.

Figure 10:
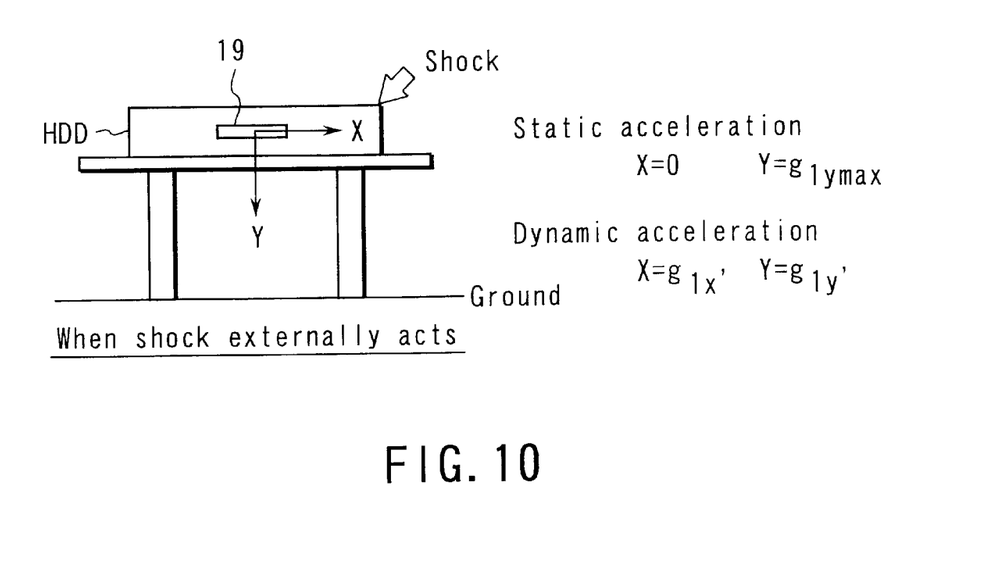
FIG. 10 is a view for explaining an operation in a shock inflicted state in the first example.

In a shock inflicted state (an external shock is acting on the HDD) shown in FIG. 10, X- and Y-static accelerations are respectively $X=0$ and $Y=g_{lymax}$, and X- and Y-dynamic accelerations are respectively $x=g_{lx}'$ and $Y=g_{ly}'$. That is, since a shock acted on the HDD, the X- and Y-dynamic accelerations respectively have changed to $X=g_{lx}'$ and $Y=g_{ly}'$. At this time, the CPU determines that the HDD has received a shock, and controls to stop, e.g., write access if that access of the head 14 is underway.

When the dynamic acceleration generated upon reception of a shock is higher than a specified threshold value, the heads 14 may be retracted; when the dynamic acceleration is lower than the predetermined threshold value, the heads 14 may be controlled to move in a direction not to displace the aligned heads 14 by detecting the direction of the shock. Alternatively, vibration components associated with the dynamic acceleration may be extracted, and the heads 14 may be controlled to move in a direction opposite to the vibration on the basis of the vibration components. In this manner, head alignment can be prevented from impairing due to a shock or vibration.

Figure 11:
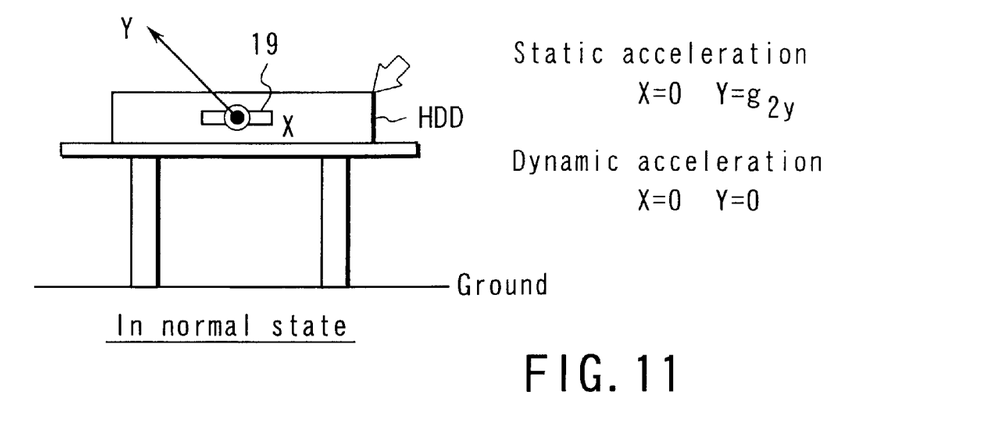
FIG. 11 is a view for explaining an operation in a normal state in a second example.

On the other hand, in the second example, the X-axis in the 2-axis acceleration sensor points into the page of the drawing, and the Y-axis to the upper left direction, as shown in FIG. 11.

In a normal state (the HDD is placed on a table) shown in FIG. 11, x- and Y-static accelerations are respectively $X=0$ and $Y=g_{2y}$ (not maximum value), and X- and Y-dynamic accelerations are respectively $X=0$ and $Y=0$. In this case, the CPU 25 does not execute the retract control of the heads 14.

Figure 12:
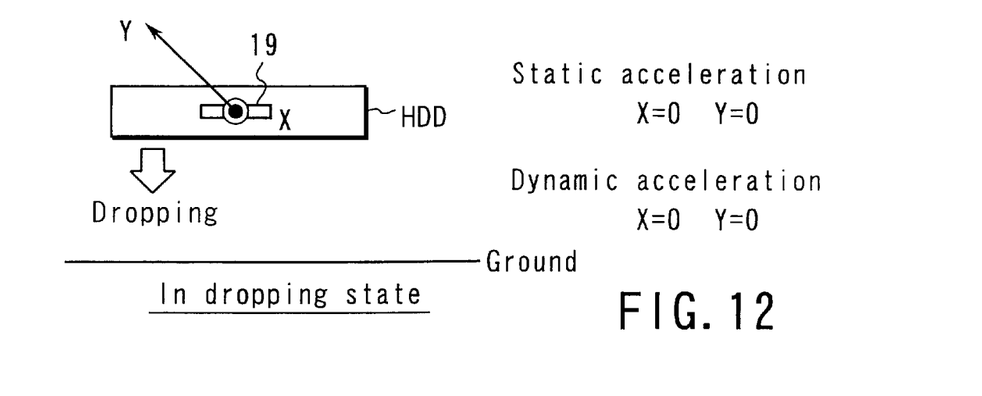
FIG. 12 is a view for explaining an operation in a dropping state in the second example.

In a dropping state (the HDD is dropping) shown in FIG. 12, X- and Y-static accelerations are respectively $X=0$ and $Y=0$, and X- and Y-dynamic accelerations are respectively $X=0$ and $Y=0$, as in the first example. That is, the 2-axis acceleration sensor does not detect any gravity since the HDD is dropping, and the Y-static acceleration has changed from $Y=g_{2y}$ to $Y=0$.

When the CPU 25 detects that the Y-static acceleration becomes Y=0, it determines that the HDD is dropping, and executes the retract control of the heads 14. Preferably, a specified threshold value larger than 0 and smaller than $g_{2y}$ is set in advance, and the retract control of the heads 14 is executed when the Y-static acceleration becomes smaller than this threshold value, in place of executing the retract control at the time when the Y-static acceleration becomes Y=0.

Figure 13:
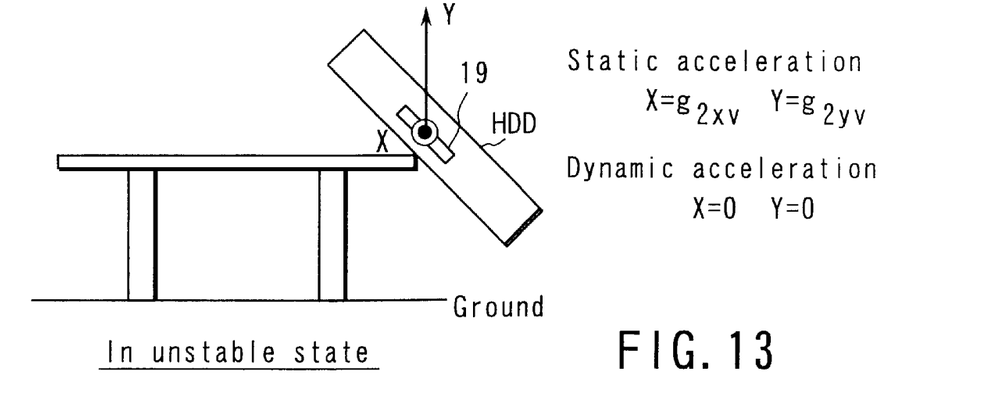
FIG. 13 is a view for explaining an operation in an unstable state in the second example.

In an unstable state (an unstable state in which the HDD tilts and is about to drop) shown in FIG. 13, X- and Y-static accelerations are respectively $X=g_{2xv}$ and $Y=g_{2yv}$, and X- and Y-dynamic accelerations are respectively X=0 and Y=0. That is, since the HDD has a tilt, the X- and Y-static accelerations respectively have changed to $X=g_{2xv}$ and $Y=g_{2yv}$.

Figure 14:
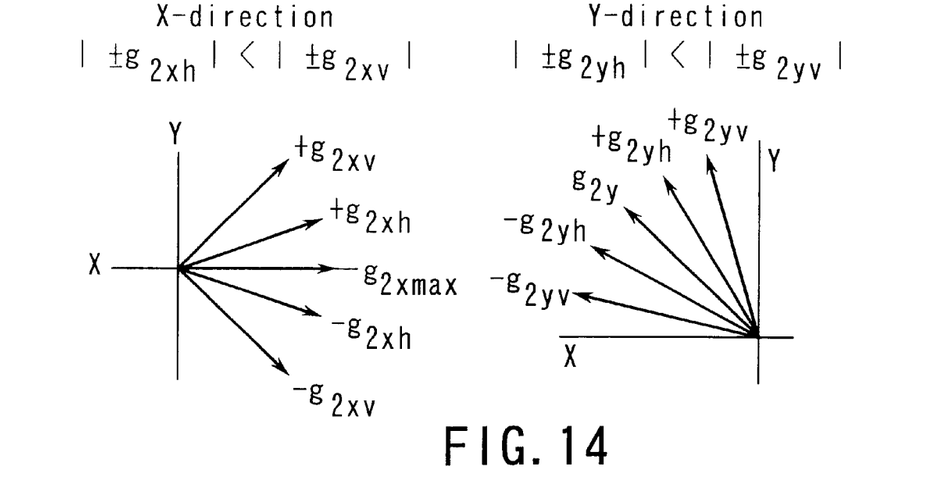
FIG. 14 is a view for explaining conditions where an unstable state is determined in the second example.

Assume that threshold values for checking if the HDD has a tilt are pre-set at $x=\pm g_{2xh}$ and $Y=\pm g_{2yh}$, as shown in FIG. 14. In this case, if a condition:

X-axis direction: $|\pm g_{2xh}|<|\pm g_{2xv}|$ or

Y-axis direction: $|\pm g_{2yh}|<|\pm g_{2yv}|$ is satisfied, the CPU 25 determines that the HDD is in an unstable state, and executes the retract control of the heads 14.

Figure 15:
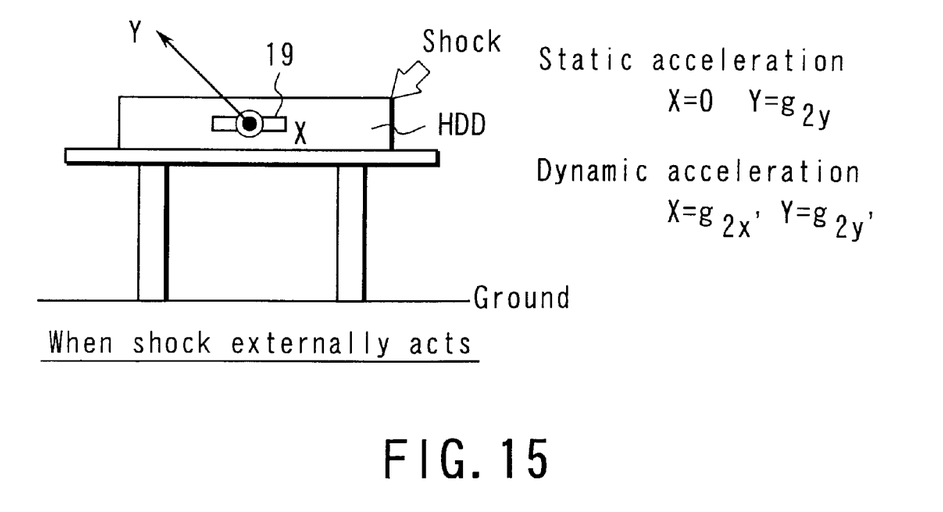
FIG. 15 is a view for explaining an operation in a shock inflicted state in the first example.

In a shock inflicted state (an external shock is applied onto the HDD) shown in FIG. 15, X- and Y-static accelerations are respectively X=0 and $Y=g_{2y}$, and X- and Y-dynamic accelerations are respectively $X=g_{2x}'$ and $Y=g_{2y}'$. That is, since a shock acted on the HDD, the X- and Y-dynamic accelerations respectively have changed to $X=g_{2x}'$ and $Y=g_{2y}'$. At this time, the CPU determines that the HDD has received a shock, and controls to stop, e.g., write access if that access of the head 14 is underway.

When the dynamic acceleration generated upon reception of a shock is higher than a specified threshold value, the heads 14 may be retracted; when the dynamic acceleration is lower than the predetermined threshold value, the heads 14 may be controlled to move in a direction not to displace the aligned heads 14 by detecting the direction of the shock. Alternatively, vibration components associated with the dynamic acceleration may be extracted, and the heads 14 may be controlled to move in a direction opposite to the vibration on the basis of the vibration components. In this manner, head alignment can be prevented from impairing due to a shock or vibration.

In this manner, according to this embodiment, since the current change in tilt or gravity of the HDD can be detected, the unstable or dropping state of the HDD can be determined, and the heads can be retracted to a safe state before they receive a shock.

Since the 2-axis acceleration sensor and sensor output extraction unit are mounted on the printed circuit board of an ordinary HDD, and the CPU executes the control characterizing the embodiment of the invention, a simple arrangement can be achieved while suppressing a mounting area.

Since the 2-axis acceleration sensor used is an IC, it can provide excellent effects in terms of size, mass production, detection precision, and cost.

Also, since the 2-axis acceleration sensor used has a function of detecting a shock as in a shock sensor used in a conventional HDD, the 2-axis acceleration sensor can be used as a substitute of the conventional shock sensor, improving the functions while minimizing an increase in cost.

Since the measured acceleration signals are exchanged as digital signals, the need for an A/D converter can be obviated, and peripheral circuits can be simplified.

Note that the present invention is not limited to the aforementioned embodiment, and various modifications may be made within the scope of the invention. For example, the 2-axis acceleration sensor is used in the above embodiment. In place of this sensor, a 3-axis acceleration sensor may be used. In the above embodiment, the 2-axis acceleration sensor is mounted on the FPC, but may be mounted at another location (e.g., on the PCB or carriage).

Further, the present invention is not limited to a magnetic disk drive although the above embodiment adopts the magnetic disk drive. That is, the present invention is also adaptable to a disk drive other than the magnetic disk drive as long as the disk drive has an acceleration sensor describe above.

As described in detail above, according to the present invention, it is possible to provide a disk drive which is capable of precisely detecting an unstable state, dropping state, or the like by a simple arrangement while reducing a mounting area, and is capable of satisfactorily taking a measure against a shock in dropping or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
   an acceleration sensor which has at least two detection axes and detects dynamic and static accelerations;
   an extraction unit which acquires detection signals corresponding to the static acceleration for respective detection axes by extracting frequency components lower than a frequency component associated with the dynamic acceleration; and
   a processing unit which determines whether or not a head is to be retracted, by at least determining whether or not said disk drive has a tilt based on the acquired detection signals for respective detection axes.

2. The disk drive according to claim 1, wherein said processing unit determines whether or not said disk drive is dropping, based on the detection signal corresponding to a specified detection axis of the acquired detection signals for respective detection axes.

3. The disk drive according to claim 1, wherein said processing unit causes the head to be retracted when a value of the detection signal corresponding to a specified detection axis of the acquired detection signals for respective detection axes becomes lower than a threshold value.

4. The disk drive according to claim 1, wherein said processing unit causes the head to be retracted when a value of the detection signal corresponding to one detection axis of the acquired detection signals for respective detection axes becomes higher than a threshold value.

5. The disk drive according to claim 1, wherein said extraction unit comprises a filter which passes a specified frequency band.

6. The disk drive according to claim 1, wherein said extraction unit comprises a circuit which determines whether or not a signal that has exceeded a threshold value is detected within a specified period of time.

7. A disk drive comprising:
   a printed circuit board; an acceleration sensor which is mounted on said printed circuit board, has at least two detection axes, and detects dynamic and static accelerations;

an extraction unit which is mounted on said printed circuit board, and acquires detection signals corresponding to the static acceleration for respective detection axes by extracting frequency components lower than a frequency component associated with the dynamic acceleration; and a processing unit which determines whether or not a head is to be retracted, by at least determining whether or not said disk drive has a tilt based on the acquired detection signals for respective detection axes.

8. The disk drive according to claim 7, wherein said processing unit determines whether or not said disk drive is dropping, based on the detection signal corresponding to a specified detection axis of the acquired detection signals for respective detection axes.

9. The disk drive according to claim 7, wherein said processing unit causes the head to be retracted when a value of the detection signal corresponding to a specified detection axis of the acquired detection signals for respective detection axes becomes lower than a threshold value.

10. The disk drive according to claim 7, wherein said processing unit causes the head to be retracted when a value of the detection signal corresponding to one detection axis of the acquired detection signals for respective detection axes becomes higher than a threshold value.

11. The disk drive according to claim 7, wherein said extraction unit comprises a filter which passes a specified frequency band.

12. The disk drive according to claim 7, wherein said extraction unit comprises a circuit which determines whether or not a signal that has exceeded a threshold value is detected within a specified period of time.

* * * * *